(12) United States Patent
Kawai et al.

(10) Patent No.: US 6,288,827 B1
(45) Date of Patent: Sep. 11, 2001

(54) FARADAY ROTATOR

(75) Inventors: Hirotaka Kawai, Shizuoka; Hiromitsu Umezawa; Hidenori Nakada, both of Aichi; Nobuhiro Fukushima, Kanagawa, all of (JP)

(73) Assignees: FDK Corporation, Tokyo; Fujitsu Limited, Kanagawa, both of (JP)

( * ) Notice: Subject to any disclaimer, the term of this patent is extended or adjusted under 35 U.S.C. 154(b) by 0 days.

(21) Appl. No.: 09/259,039

(22) Filed: Feb. 26, 1999

(30) Foreign Application Priority Data

Mar. 3, 1998 (JP) ................................... 10-067753

(51) Int. Cl.$^7$ ....................................... G02F 1/09
(52) U.S. Cl. ......................... 359/283; 359/280; 359/281; 359/282; 359/484
(58) Field of Search .................... 359/280–283, 359/484

(56) References Cited

U.S. PATENT DOCUMENTS

| 3,495,189 |   | 2/1970  | Le Craw ................. 324/96 |
|-----------|---|---------|---------------------------------|
| 3,810,245 | * | 5/1974  | Ozawa et al. .......... 360/127  |
| 4,609,257 |   | 9/1986  | Shirasaki .............. 359/283 |
| 4,612,500 | * | 9/1986  | Chen et al. ............ 324/96  |
| 4,756,607 |   | 7/1988  | Watanabe et al. ...... 359/484  |
| 4,896,103 |   | 1/1990  | Shimanuki ........... 359/283    |
| 4,988,170 |   | 1/1991  | Buhrer ................. 359/497 |
| 5,640,516 |   | 6/1997  | Iwatsuka et al. ..... 359/280   |
| 5,812,304 |   | 9/1998  | Shirasaki et al. .... 359/324   |
| 5,867,300 |   | 2/1999  | Onaka et al. ......... 359/283  |
| 5,973,821 |   | 10/1999 | Onaka et al. ......... 359/283  |

FOREIGN PATENT DOCUMENTS

| 58-49916  | 3/1983 | (JP) . |
| 6-51255   | 2/1994 | (JP) . |
| 9-61770   | 3/1997 | (JP) . |
| 9-236784  | 9/1997 | (JP) . |

\* cited by examiner

*Primary Examiner*—Evelyn A Lester
(74) *Attorney, Agent, or Firm*—Dougherty & Clements LLP

(57) ABSTRACT

Disclosed is a Faraday rotator capable of reducing the temperature dependence on a Faraday rotation angle, thereby enhancing the temperature characteristic, particularly, in a service environment in which the magnetization direction is variable, and an optical device using the Faraday rotator. The Faraday rotator includes a Faraday element which rotates the polarization plane of polarized light rays passing through the Faraday element when an external magnetic field is applied to the Faraday element. In this Faraday rotator, assuming that an angle between a magnetization direction of the Faraday element and a light ray direction is taken as $\alpha$, the amount of the temperature-dependent change in Faraday rotation angle is reduced by applying the external magnetic field in a direction in which a first amount of the change in Faraday rotation angle due to the temperature dependence on the angle $\alpha$ and a second amount of the change in Faraday rotation angle due to the temperature dependence on the Faraday effect satisfy a relationship in which the sign of the first amount is plus or minus, the sign of the second amount is minus or plus, and the absolute value of one of the first and second amounts is less than twice the absolute value of the other amount, more preferably, substantially equal to the absolute value of the other amount.

14 Claims, 13 Drawing Sheets light ray

α magnetization

20

$\theta_{Fmax}$

α light ray direction $\theta_F = \theta_{Fmax} \times \cos \alpha$

Fig. 5
Fig. 5A
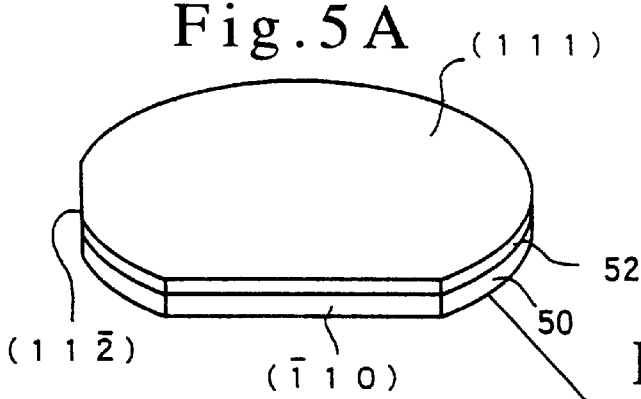
Fig. 5B
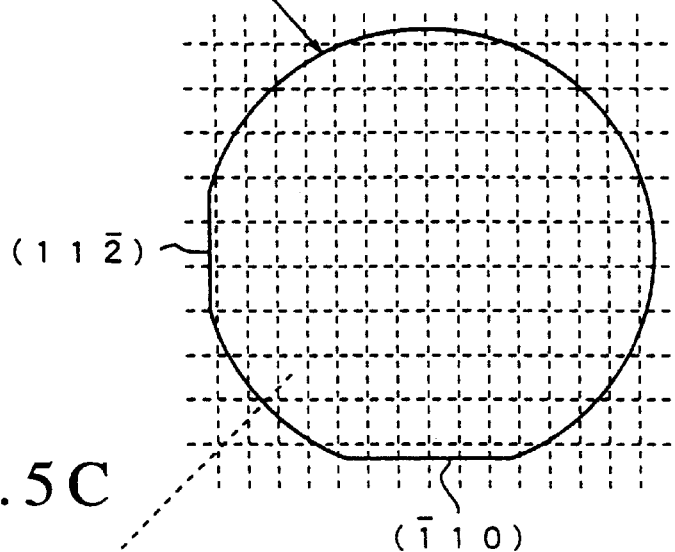
Fig. 5C
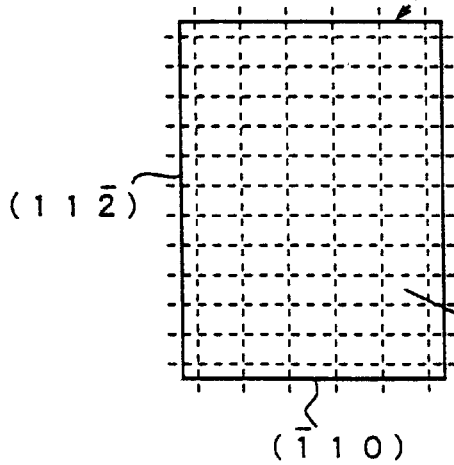
Fig. 5D
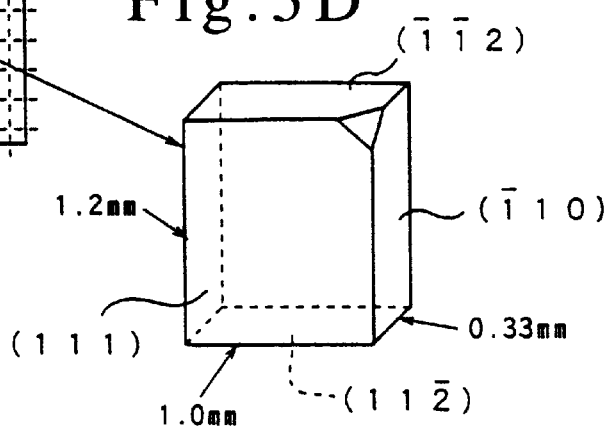

Fig.7  route"a"
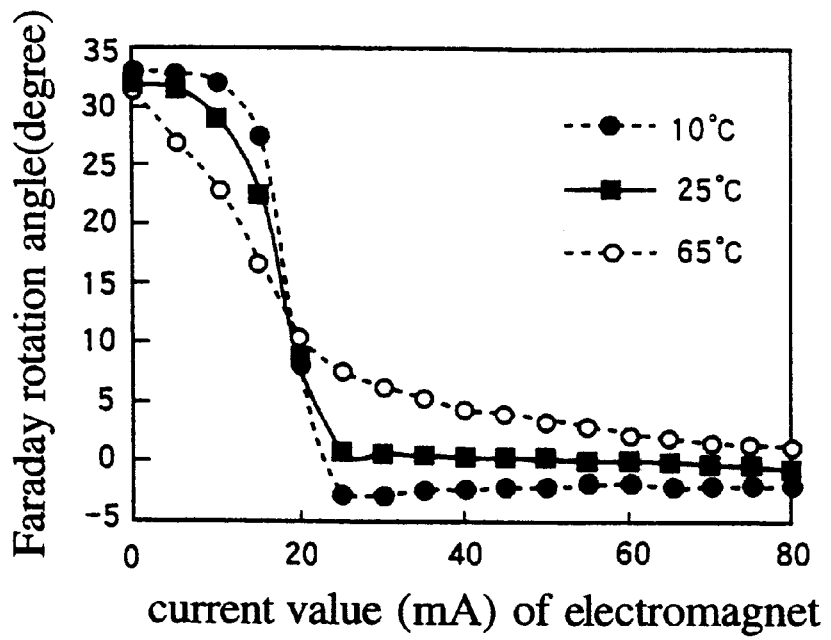
Fig.8  route"b"
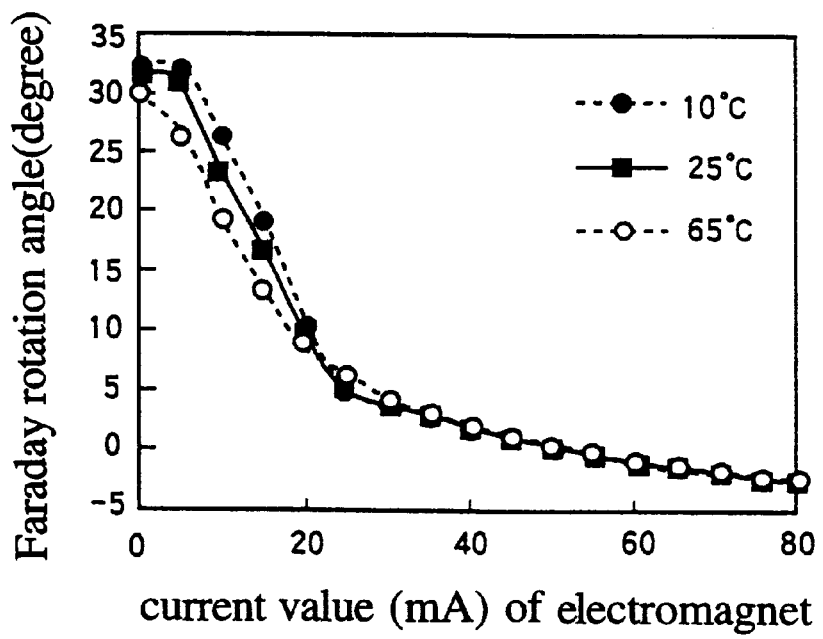

Fig. 9 route"c"
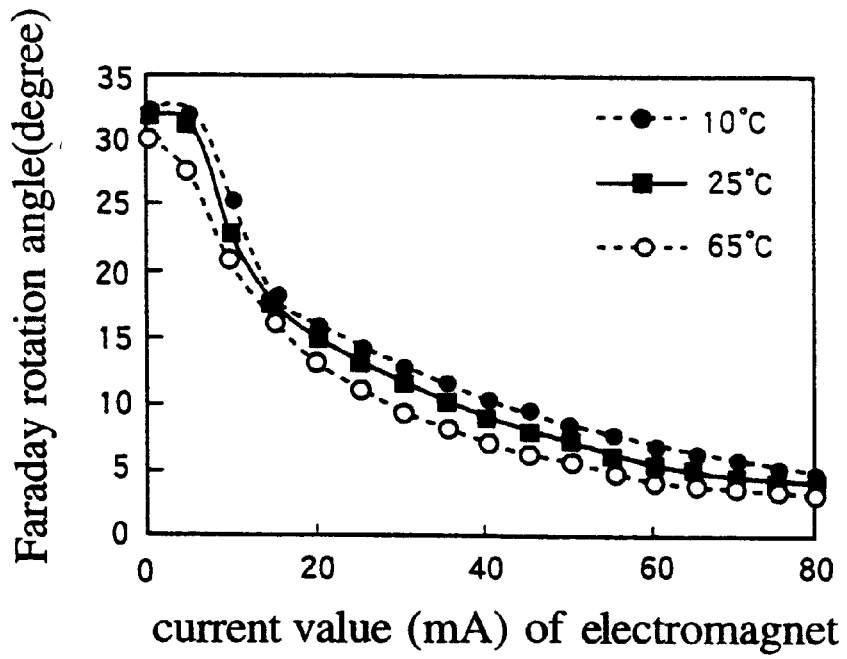
Fig. 10 route"d"
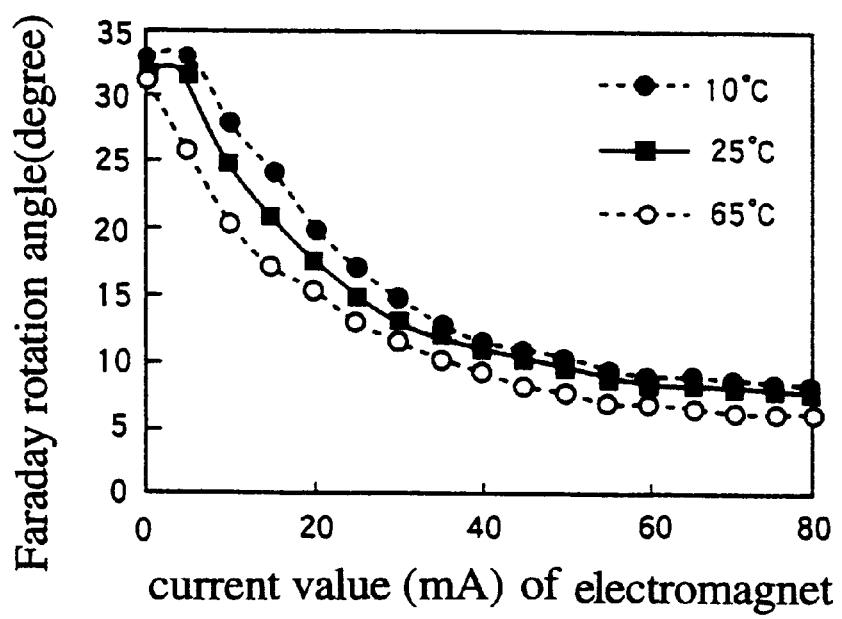

FARADAY ROTATOR

BACKGROUND OF THE INVENTION

1. Technical Field of the Invention

The present invention relates to a Faraday rotator in which a Faraday element and an external magnetic rield applying means are arranged such that the magnetization direction of the Faraday element is tilted with respect to a light ray direction, and particularly to a Faraday rotator capable of reducing the amount of the temperature-dependent change in Faraday rotation angle by making use of the temperature dependence on an angle α between the magnetization direction of the Faraday element and the light ray direction. Such a Faraday rotator is useful for various optical devices utilizing the Faraday effect, such as an optical attenuator, and an optical isolator.

2. Related Art

Optical communication systems require an optical isolator for allowing light rays to pass therethrough only in one direction, an optical attenuator for controlling the quantity of light rays passing therethrough, etc., and a Faraday rotator for rotating the polarization plane of light rays passing therethrough is incorporated in the optical isolator, optical annenuator, etc. The Faraday rotator is also used for other optical devices such as an optical switch, optical circulator, optical filter, and optical equalizer.

An optical isolator has a configuration, for example, shown in FIGS. 21A and 21B in which a 45° Faraday rotator 3 is inserted between a polarizer 1 and an analyzer 2 which are arranged such that the polarization planes of light rays passing through the polarizer 1 and analyzer 2 intersect one another at 45°. The Faraday rotator 3 includes a Faraday element composed of a magnetooptic crystal in combination with a permanent magnet as an external magnetic field applying means. An external magnetic field is applied to the Faraday element by the permanent magnet in such a manner as to correspond to a light ray direction, to realize a magnetic saturation state of the magnetooptic crystal. The magnetooptic crystal is designed to have a thickness allowing the polarization plane of light rays passing therethrough to be rotated 45° in the above magnetic saturation state. When light rays are allowed to pass through the optical isolator in the forward direction, the light rays having passed through the polarizer 1 pass through the analyzer 2 almost with no loss (see FIG. 21A). On the contrary, when light rays are allowed to pass through the optical isolator in the reverse direction, the light rays having passed through the analyzer 2 cannot pass through the polarizer 1 because the polarization plane of the light rays having passed through the Faraday rotator 3 are rendered perpendicular to the polarizer 1 (see FIG. 21B). This optical isolator is of a polarization-dependent type; however, there is also known a polarization-independent type (see Japanese Patent Application No. Sho 56-148290).

One example of a prior art optical attenuator is shown in FIGS. 2A and 2B. As shown in FIG. 2A, a polarizer 14 composed of a wedge-shaped birefringent crystal (for example, rutile), a Faraday rotator 15, and an analyzer 16 composed of a wedge-shaped birefringent crystal 16 are arranged on the optical axis in this order between an input fiber 12 having a collimate lens 10 and an output fiber 13 having a collimate lens 11 (see Japanese Patent Application No. Hei 4-205044). The Faraday rotator 15 includes, as shown in FIG. 2B, a Faraday element (magnetooptic crystal) 17 in combination with a permanent magnet 18 and an electromagnet 19 for applying magnetic fields to the Faraday element 17 in two directions which are 90° offset from each other. The magnetization direction of the Faraday element 17 is matched with the direction of a synthetic magnetic field of a specific magnetic field applied by the permanent magnet 18 and a variable magnetic field applied by the electromagnet 19. Therefore, the Faraday rotation angle is variable.

For example, when the polarizer 14 and the analyzer 16 are arranged such that the optical axes of both the birefringent crystals thereof are rendered parallel to each other, the optical attenuator operates as follows. Light rays having gone out of the input fiber 12 are converted into a collimated light beam through the first lens 10 and are separated into an ordinary light ray o and an extraordinary light ray e through the polarizer 14. The polarization direction of the ordinary light ray o is perpendicular to that of the extraordinary light ray e. When the light rays o and e pass through the Faraday rotator 15, the polarization direction of each of the light rays o and e is rotated depending on the magnitude of a component of the magnetization of the Faraday element 17 in the direction parallel to the optical axis. The light rays o and e are then separated, through the analyzer 16, into an ordinary light ray $o_1$ and an extraordinary light ray $e_1$, and an ordinary light ray $o_2$ and an extraordinary light ray $e_2$, respectively. As shown by solid lines in FIG. 2A, the ordinary light ray $o_1$ and extraordinary light ray $e_2$ outgoing from the analyzer 16 are parallel to each other, and are coupled to the output fiber 13 through the second lens 11. Meanwhile, as shown by broken lines in FIG. 2A, the extraordinary light ray $e_1$ and ordinary light ray $o_2$ outgoing from the analyzer 16 are not parallel to each other but spread outwardly, and are not coupled to the output fiber 13 through the second lens 11.

When the magnetic field applied to the Faraday element 17 by the electromagnet 19 comes into zero, that is, when the magnetization direction of the Faraday element 17 is rendered parallel to the optical axis, the Faraday rotation angle of the Faraday element 17 becomes 90°. At this time, the ordinary light ray o having gone out of the polarizer 14 goes out of the analyzer 16 as the extraordinary light ray $e_1$. The extraordinary light ray e having gone out of the polarizer 14 goes out of the analyzer 16 as the ordinary light ray $o_2$. The light rays $e_1$ and $o_2$ are spread outwardly, and are not coupled to the output fiber 13 through the second lens 11. On the contrary, when the magnetic field applied to the Faraday element 17 by the electromagnet 19 becomes sufficiently large, the Faraday rotation angle of the Faraday element 17 comes closer to 0°. At this time, almost all of the ordinary light ray o having gone out of the polarizer 14 goes out of the analyzer 16 as the ordinary light ray $o_1$, and almost all of the extraordinary light ray e having gone out of the polarizer 14 goes out of the analyzer 16 as the extraordinary light ray $e_2$. The light rays $o_1$ and $e_2$ are parallel to each other, and are all coupled to the output fiber 13 through the second lens 11. The magnetization of the Faraday element 17 is thus rotated depending on the strength of the magnetic field applied to the Faraday element 17 by the electromagnet 19, to change the Faraday rotation angle of the Faraday element 17 in a range of about 90 to about 0°, thereby making variable the quantity of the light rays coupled to the output fiber 13 in accordance with the amount of the change in Faraday rotation angle. In this way, the above configuration including the Faraday rotator 15 functions as an optical attenuator.

It should be noted that if the polarizer 14 and the analyzer 16 are arranged such that the optical axes of both the birefringent crystals thereof are perpendicular to each other, the optical attenuator operates in accordance with the manner reversed to that described above. That is to say, when the Faraday rotation angle of the Faraday element 17 becomes 90°, the quantity of light rays passing through the optical attenuator is maximized, while when the Faraday rotation angle of the Faraday element 17 becomes zero, the quantity of light rays passing through the optical attenuator is minimized.

As the Faraday element to be incorporated in the Faraday rotator, there has been, in recent years, used a Bi (bismuth) substitution rare earth element-iron garnet single crystal film (LPE film) which has been mainly manufactured by the LPE (Liquid Phase Epitaxial) Method. The reason for this is that the LPE film has a large advantage that the Faraday rotation coefficient is larger than that of a YIG (yttrium-iron garnet) single crystal by the effect of addition of Bi.

The Bi substitution rare earth element-iron garnet single crystal, however, has a disadvantage in that the temperature dependence on the Faraday rotation angle is large. This causes a problem in increasing the temperature dependence on the Faraday rotator, thereby making large the temperature characteristic of an optical device manufactured using the Faraday rotator, such as an optical isolator or optical attenuator.

To improve the above-described temperature characteristic of the Faraday rotator, there have been typically proposed the following three methods:

(1) to improve the physical properties of the conventional crystal by replacing it with a crystal having a special composition (Japanese Patent Application No. Sho 60-243217);

(2) to improve the temperature dependence on the Faraday rotator by using two garnet crystals as a magnetooptic element for canceling the temperature dependence on the Faraday rotation angle of one garnet crystal by that of the other garnet crystal (Japanese Patent Application Nos. Sho 60-134372 and Hei 2-180757); and (3) to improve the temperature characteristic of an optical device using a Faraday rotator, a polarizer and an analyzer by optimally arranging the polarizer and the analyzer (Japanese Patent Application No. Hei 8-45231).

The above proposed methods, however, have the following problems:

In the method (1), the temperature dependence on the Faraday rotation angle is reduced by adding Tb to the Bi substitution rare earth element-iron garnet crystal as the magnetooptic element. However, an optical isolator described in the embodiment is configured such that the thickness of a magnetooptic element of the optical isolator at a wavelength of 1.5 $\mu$m at which the temperature dependence is minimized becomes about 1,700 $\mu$m. This thickness is excessively large in consideration of the fact that the critical film thickness of a crystal allowed to be grown by the LPE method with its quality highly kept is about 500 $\mu$m.

In the method (2), since two different garnet crystals must be manufactured, the manufacturing cost becomes high.

In the method (3), an optical attenuator is realized by making use of the fact that the maximum light attenuation point (amount) in a state that the polarization plane of light rays is perpendicular to the polarizer is sensitive to the angle of the polarization plane, that is, the Faraday rotation angle, while the maximum light transmission point (amount) in a state that the polarization plane of light rays is parallel to the analyzer is insensitive to the Faraday rotation angle. That is to say, in the optical attenuator, the temperature dependence on each of the maximum amount of light attenuation and insertion loss (maximum amount of light transmission) is made smaller by making the polarization plane of light rays parallel to the analyzer when the Faraday rotation angle is maximized (at this time, the absolute value of the amount of the change in Faraday rotation angle is maximized); and making the polarization plane of light rays perpendicular to the analyzer when the Faraday rotation angle is minimized (at this time, the absolute of the amount of the change in the Faraday rotation angle is minimized). However, since the maximum light attenuation point is sensitive to the Faraday rotation angle, the temperature dependence on the Faraday rotation angle must be made very small at the maximum light attenuation point, but the reduction in temperature dependence has a limitation because the Faraday rotator essentially has the temperature dependence.

SUMMARY OF THE INVENTION

An object of the present invention is to provide a technique of reducing the temperature dependence on a Faraday rotation angle on the basis of a new principle.

Another object of the present invention is to provide a Faraday rotator capable of reducing the temperature dependence on the Faraday rotation angle.

A further object of the present invention is to provide an optical device such as an optical attenuator improved in temperature characteristic by using the Faraday rotator.

To achieve the above objects, according to a first aspect of the present invention, there is provided a Faraday rotator including: a Faraday element which rotates the polarization plane of polarized light rays passing through the Faraday element when an external magnetic field is applied to the Faraday element, wherein assuming that an angle between a magnetization direction of the Faraday element and a light ray direction is taken as $\alpha$, the amount of the temperature-dependent change in Faraday rotation angle is reduced by applying an external magnetic field in a direction in which a first amount of the change in Faraday rotation angle due to the temperature dependence on the angle $\alpha$ and a second amount of the change in Faraday rotation angle due to the temperature dependence on the Faraday effect satisfy a relationship in which the sign of the first amount is plus or minus, the sign of the second amount is minus or plus, and the absolute value of one of the first and second amounts is less than twice the absolute value of the other amount, more preferably, substantially equal to the absolute value of the other amount.

According to a second aspect of the present invention, there is provided a Faraday rotator including: a Faraday element composed of a single or a plurality of magnetooptic crystals, which rotates the polarization plane of polarized light rays passing through the Faraday element when an external magnetic field is applied to the Faraday element, wherein assuming that an angle between a magnetization direction of the single or plurality of magnetooptic crystals and a light ray direction is taken as $\alpha$, the amount of the temperature-dependent change in Faraday rotation angle is reduced by applying an external magnetic field in a single direction in which a first amount of the change in Faraday rotation angle due to the temperature dependence on the angle $\alpha$ and a second amount of the change in Faraday rotation angle due to the temperature dependence on the Faraday effect satisfy a relationship in which the sign of the first amount is plus or minus, the sign of the second amount is minus or plus, and the absolute value of one of the first and second amounts is less than twice the absolute value of the other amount.

According to a third aspect of the present invention, there is provided a Faraday rotator including: a Faraday element composed of a plurality of magnetooptic crystals arranged with their crystal orientations made different from each other, which rotates the polarization plane of polarized light rays passing through the Faraday element when an external magnetic field is applied to the Faraday element, wherein assuming that angles between magnetization directions of the magnetooptical crystals and a light ray transmission direction are taken as $\alpha_1$, $\alpha_2$, $\alpha_3$, ..., the amount of the temperature-dependent change in Faraday rotation angle is reduced by applying an external magnetic field in a direction in which the absolute value of the sum of amounts of the changes in Faraday rotation angle due to the temperature dependencies on the angles $\alpha_1$, $\alpha_2$, $\alpha_3$, ..., and an amount of the change in Faraday rotation angle due to the temperature dependence on the Faraday effect is equal to or less than the absolute value of the sum of amounts of the changes in Faraday rotation angle due to the temperature dependencies on the Faraday effect of the magnetooptic crystals.

As described above, according to the present invention, the use of the temperature dependence on magnetocrystalline anisotropy of a magnetooptic crystal used for a Faraday element makes it possible to cancel the amount of the change in Faraday rotation angle due to the temperature dependence on an angle between the magnetization direction of a magnetooptic crystal and a light ray direction by the amount of the change in Faraday rotation angle due to the temperature dependence on the Faraday effect, and hence to obtain an effect of reducing the amount of the change in Faraday rotation angle even in a service environment in which the magnetization direction of the Faraday element is changed.

BRIEF DESCRIPTION OF THE DRAWINGS

FIGS. 5A to 5D are illustrative diagrams showing manufacturing steps, shape of a final product, and orientation of a magnetic garnet single crystal;

FIG. 7 is a graph showing a relationship between a current value and a Faraday rotation angle in the case where a magnetic field is applied along a route "a";

FIG. 8 is a graph showing a relationship between a current value and a Faraday rotation angle in the case where a magnetic field is applied along a route "b";

FIG. 9 is a graph showing a relationship between a current value and a Faraday rotation angle in the case where a magnetic field is applied along a route "c";

FIG. 10 is a graph showing a relationship between a current value and a Faraday rotation angle in the case where a magnetic field is applied along a route "d";

DETAILED DESCRIPTION OF THE PREFERRED EMBODIMENTS

Hereinafter, preferred embodiments of the present invention will be described with reference to the accompanying drawings.

As a magnetooptic crystal used for a Faraday element of a Faraday rotator of the present invention, there is used a crystal having a composition of $(RBi)_3(FeM)_5O_{12}$ or $(RBi)_3Fe_5O_{12}$ (R is one or more kinds of elements selected from a group consisting of rare earth elements including yttrium; and M is one or more kinds of elements substitutable with iron) which is manufactured by, for example, the liquid phase epitaxial method. Typically, a crystal having a composition of $Tb_{1.00}Y_{0.65}Bi_{1.35}FE_{4.05}Ga_{0.95}O_{12}$ is used, and further a garnet single crystal having a composition of $Y_3Fe_5O_{12}$ may be used.

In a Faraday rotator of the present invention, an external magnetic field is applied to a Faraday element in such a manner as to tilt the magnetization direction of the Faraday element with respect to a light ray direction. For example, a pair of permanent magnets or an electromagnet are arranged obliquely with respect to a light ray direction. Alternatively, there is known a configuration in which magnetic fields are applied to a Faraday element in two directions, one being parallel to, and the other being perpendicular to a light ray direction, for example, by a permanent magnet and an electromagnet, respectively.

The above-described Faraday rotator is usable for various optical devices such as an optical isolator, optical attenuator, optical switch, optical circulator, optical filter, and optical equalizer.

Figure 1A:
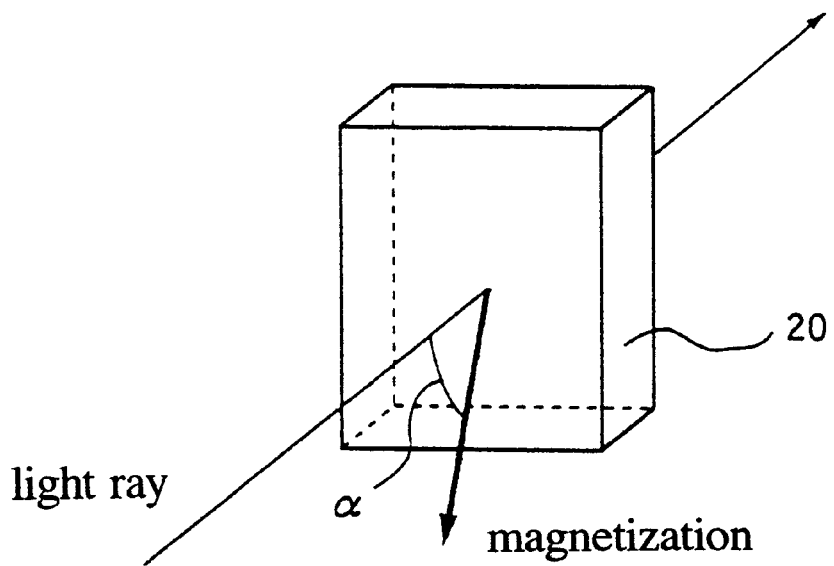
FIGS. 1A and 1B are illustrative diagrams showing a relationship between a magnetization direction of a magnetic garnet single crystal of the present invention and a light ray direction.
Figure 1B:
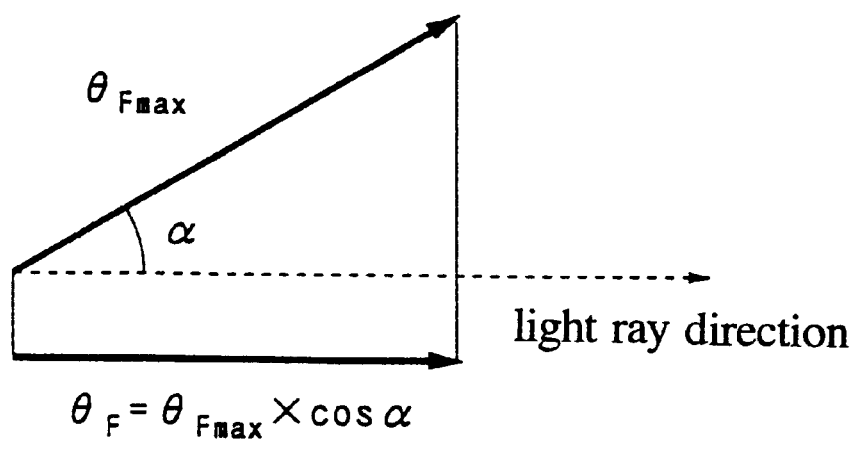
Figure 2A:
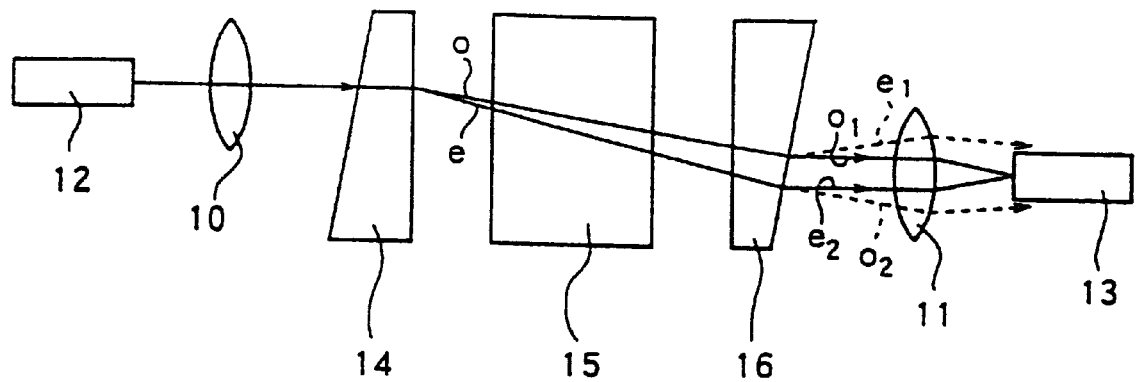
FIGS. 2A and 2B are illustrative diagrams showing one example of a prior art optical attenuator.
Figure 2B:
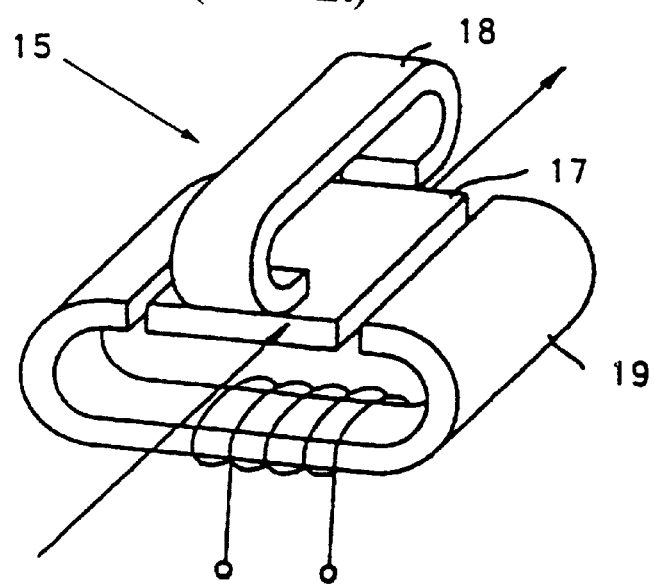

Assuming that as shown in FIG. 1A, when a light ray passes through a Faraday element 20, the magnetization direction of the Faraday element 20 is tilted by an angle $\alpha$ with respect to the light ray direction, a Faraday rotation angle $\theta_F$ of the Faraday element 20 is, as is apparent from FIG. 1B, expressed by the following equation (1):

$$\theta_F = \theta_{Fmax} \times \cos \alpha \tag{1}$$

In the above equation (1), $\theta_{Fmax}$ is the maximum value of the Faraday rotation angle, which value is obtained when the magnetization direction corresponds to the light ray direction. The term "cos α" means that the polarization plane of light rays is rotated only depending on a component of the magnetization in the light ray direction. Here, it is important that the magnetization direction of the Faraday element is affected not only by the external magnetic field but also by the magnetocrystalline anisotropy of the magnetooptic crystal forming the Faraday element 20. That is to say, not only the maximum Faraday rotation angle $\theta_{Fmax}$ but also the angle α is a function of a temperature T. Accordingly, the above equation (1) can be expressed by the following equation (2):

$$\theta_F(T) = \theta_{Fmax}(T) \times \cos \alpha(T) \tag{2}$$

From the equation (2), the temperature coefficient of the Faraday rotation angle is given by $$\frac{d\theta_F}{dT} = \cos\alpha \times \frac{d\theta_{Fmax}}{dT} + \theta_{Fmax} \times (-\sin\alpha) \times \frac{d\alpha}{dT} \tag{3}$$

In the equation (3), assuming that the constant terms are taken as $C1 = \cos\alpha$ and $C2 = \theta_{Fmax} \times (-\sin\alpha)$, the above equation (3) can be expressed by the following equation (4):

$$\frac{d\theta_F}{dT} = C1 \times \frac{d\theta_{Fmax}}{dT} + C2 \times \frac{d\alpha}{dT} \tag{4}$$

In the equation (4), the first term on the right side is the temperature coefficient of the Faraday rotation angle due to the temperature dependence on the Faraday effect in the Faraday element, and the second term on the right side is the change ratio of the Faraday rotation angle due to the temperature dependence on the angle α between the magnetization direction of the Faraday element and the light ray direction. The change in the angle α is originated from the temperature dependence on the magnetocrystalline anisotropy of the magnetooptic crystal forming the Faraday element 20. In the case of a prior art Faraday rotator used for an optical isolator, since a sufficiently large external magnetic field is applied to a Faraday element in a light ray direction, that is, the magnetization direction of the Faraday element usually corresponds to the light ray direction, the second term on the right side of the equation (4) is usually zero, and therefore, only the temperature coefficient of the material forming the Faraday element may be examined.

As described above, the first term on the right side of the equation (4) is determined by the physical properties of the material forming the Faraday element and thereby the numerical value thereof cannot be varied by changing the design; however, since the second term includes the angle α, the numerical value thereof can be made large or small and also the sign of the numerical value can be made positive or negative by changing the crystal orientation. To be more specific, by setting the magnetization direction to correspond to a specific orientation of the Faraday element, the sign (plus or minus) of the second term on the right side can be reversed to the sign of the first term on the right side, to nearly cancel the amount of the change in Faraday rotation angle, thereby making small the temperature dependence on the Faraday rotation angle.

Figure 3:
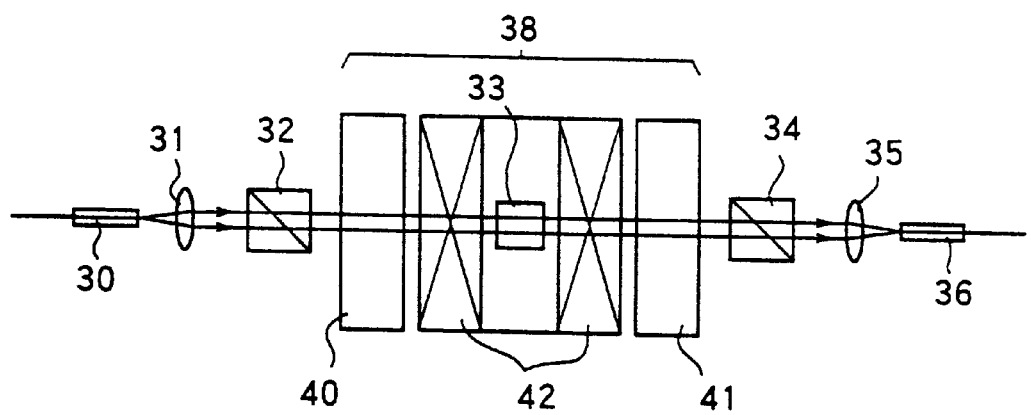
FIG. 3 is an illustrative diagram showing a measurement system used in the present invention.
Figure 4:
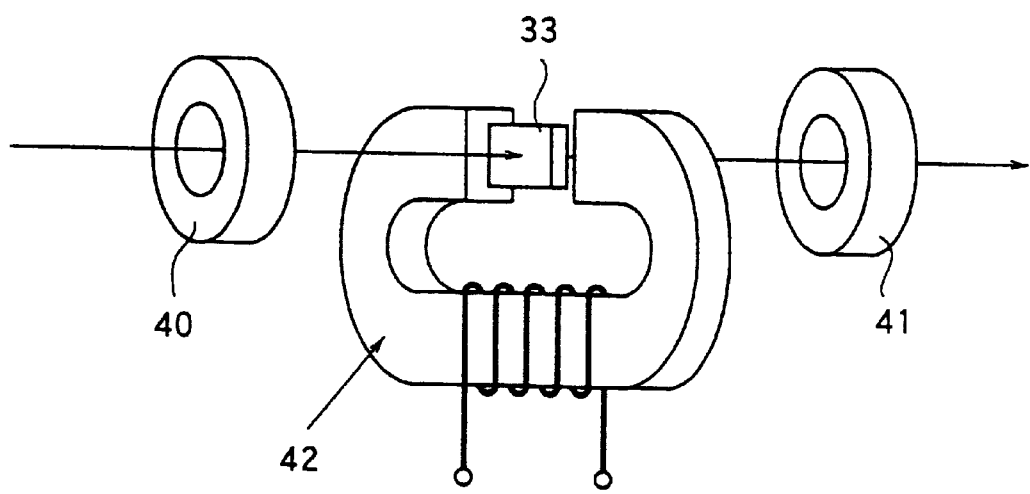
FIG. 4 is an illustrative diagram showing one example of a Faraday rotator shown in FIG. 3.

A measurement system shown in FIG. 3 was prepared, and the Faraday rotation angle of the Faraday element was measured using the measurement system in accordance with a polarization modulation method. In this measurement, the direction of the external magnetic field applied to the Faraday element, the drive current value of an electromagnet, and an environmental temperature were arbitrarily changed. The structure of the measurement system is basically the same as that of an optical attenuator. Light rays having gone out of an optical fiber 30 are converted into parallel light rays through a lens 31, passing through a polarizer 32, a Faraday element 33, and an analyzer 34, and are focussed at an incident end of an optical fiber 36 through a lens 35. In the figure, reference numeral 38 designates a Faraday rotator. One example of the Faraday rotator is shown in FIG. 4. A Faraday element 33 is applied with a magnetic field in the direction parallel to the optical axis by a pair of permanent magnets 40 and 41 to be turned into a magnetic saturation state, and is applied with a magnetic field in the direction perpendicular to the optical axis by an electromagnet 42. The synthetic magnetic field of the magnetic fields applied by the permanent magnets 40 and 41 and the electromagnet 42 is varied by changing a coil current flowing in the electromagnet 42. A garnet single crystal was used for the Faraday element.

The garnet single crystal used for the Faraday element was prepared in the following procedure. A Bi substitution rare earth iron garnet single crystal (LPE film, composition: $Tb_{1.00}Y_{0.65}Bi_{1.35}Fe_{4.05}Ga_{0.95}O_{12}$, film thickness: 450 μm) was grown onto the (111) oriented substrate( lattice constant: 12.496 Å, composition: $(CaGd)_3(MgZrGa)_5O_{12})$ having a diameter of 3 inches and a thickness of 1170 μm using a flux of $PbO—B_2O_3—Bi_2O_3$ by the liquid phase epitaxial method (LPE method). As shown in FIGS. 5A to 5D, the substrate 50 is previously formed with two large and small flat planes (orientation flats). The large flat plane is the (110) plane, and the small flat plane is the (112) plane. In the figure, reference numeral 52 designates the LPE film. The LPE film grown on the substrate 50 thus obtained was then cut into a size of 7.6 mm×5.0 mm, being polished to remove the substrate 50 therefrom, and the LPE film was annealed in atmospheric air at 1100° C. for 8 hr. The annealing is performed for reducing the growth-induced uniaxial magnetocrystalline anisotropy constant. The LPE film was then polished again to be thus mirror-finished into a shape of 7.6 mm×5.0 mm×0.33 mm. Antireflection coatings were deposited on both the front and rear (111) planes of the LPE film. The LPE film was cut into a size of 1.0 mm×1.2 mm×0.33 mm. Finally, an intersection among the (111) plane, ($\overline{1}10$) plane and ($\overline{1}\overline{1}2$) plane was slightly cut off to form an orientation mark. The shape and faces of the final garnet single crystal are shown in FIG. 5D. A magnetic field required for realizing the magnetic saturation state of the garnet single crystal was measured by the VSM (Vibrating Sample Magnetometer). As a result, the required magnetic field was 120 Oe. On the basis of the measured result, a fixed magnetic field of 150 Oe was applied to the garnet single crystal by a permanent magnet, to thus realize the magnetic saturation state of the garnet single crystal. The Faraday rotation angle of the garnet single crystal was measured in a condition that light rays were made incident on the garnet single crystal in the direction perpendicular to the plane, on which the antireflection coating was deposited, that is, (111) plane of the garnet single crystal. The Faraday rotation angle of the garnet single crystal in the case where the magnetization of the garnet single crystal was rendered parallel to the light rays was 32°. (In the notation for expressing the planes and orientations of a crystal, a negative index should be expressed by placing a crossbar on the numerical value of the index; however, in this specification, the numerical value of the index is added with a minus sign for convenience).

Figure 6:
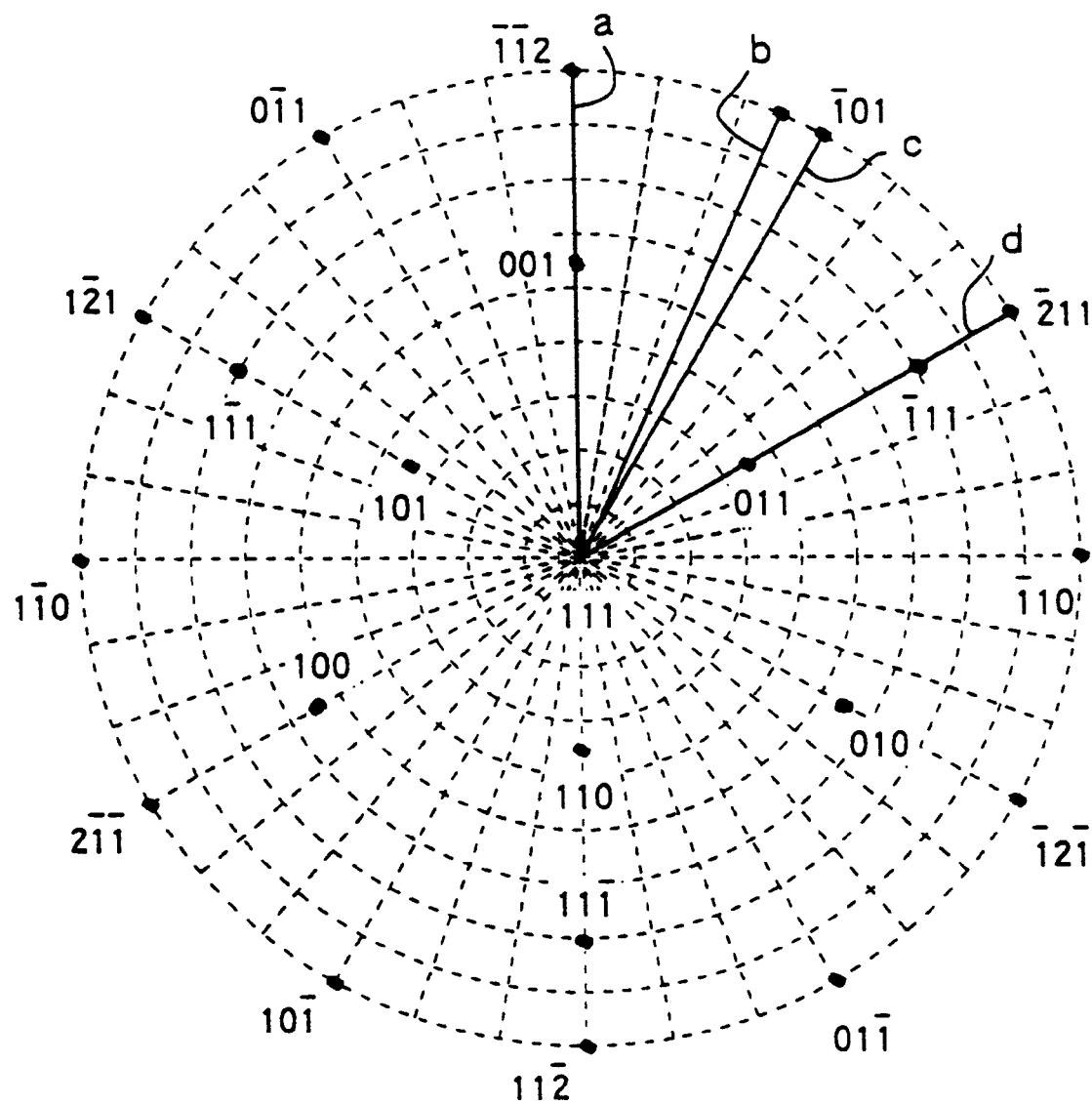
FIG. 6 is a stereographic projection chart centered at the (111) plane of a magnetic garnet single crystal.

FIG. 6 is a stereographic projection chart centered at the (111) plane of a garnet single crystal. In the chart, adjacent two concentric circles indicates planes 10° offset from each other, and adjacent two radial lines indicate planes 10° offset from each other. Any plane of the garnet single crystal can be indicated as a point in the stereographic projection chart.

The Faraday rotation angle of the garnet single crystal was measured by applying a magnetic field of 150 Oe to the garnet single crystal by a permanent magnet in the vertical direction from rear to front of the paper plane of the drawing, to thereby realize the magnetic saturation state of the garnet single crystal; and further applying a magnetic field to the garnet single crystal by an electromagnet in a direction along each of an "a" orientation ($\bar{1}12$) orientation), a "b" orientation (24° offset from ($\bar{1}12$) orientation to ($\bar{1}01$) orientation), a "c" orientation ($\bar{1}01$) orientation), and a "d" orientation ($\bar{2}11$) orientation). The measurement was performed at a measurement temperature of each of 10° C., 25° C. and 65° C.

The results of measuring the Faraday rotation angle are shown in FIGS. 7 to 10. From the comparison between the measured results shown in FIGS. 7 to 10, it is apparent that the spectrum of the Faraday rotation angle largely varies depending on the direction of the applied magnetic field. The reason for this is due to the fact that the measured Faraday rotation angle is not only dependent on the Faraday effect but also dependent on the magnetocrystalline anisotropy. The garnet single crystal has such a magnetocrystalline anisotropy that the (111) orientation and its symmetric equivalent orientation are easy axes while the <100> orientation and its symmetrically equivalent orientation are hard axes. The magnetocrystalline anisotropy constant becomes larger with decreasing temperature (see P. Hansen and others: Thin Solid Films, 114 (1984) 69–107).

Figure 11:
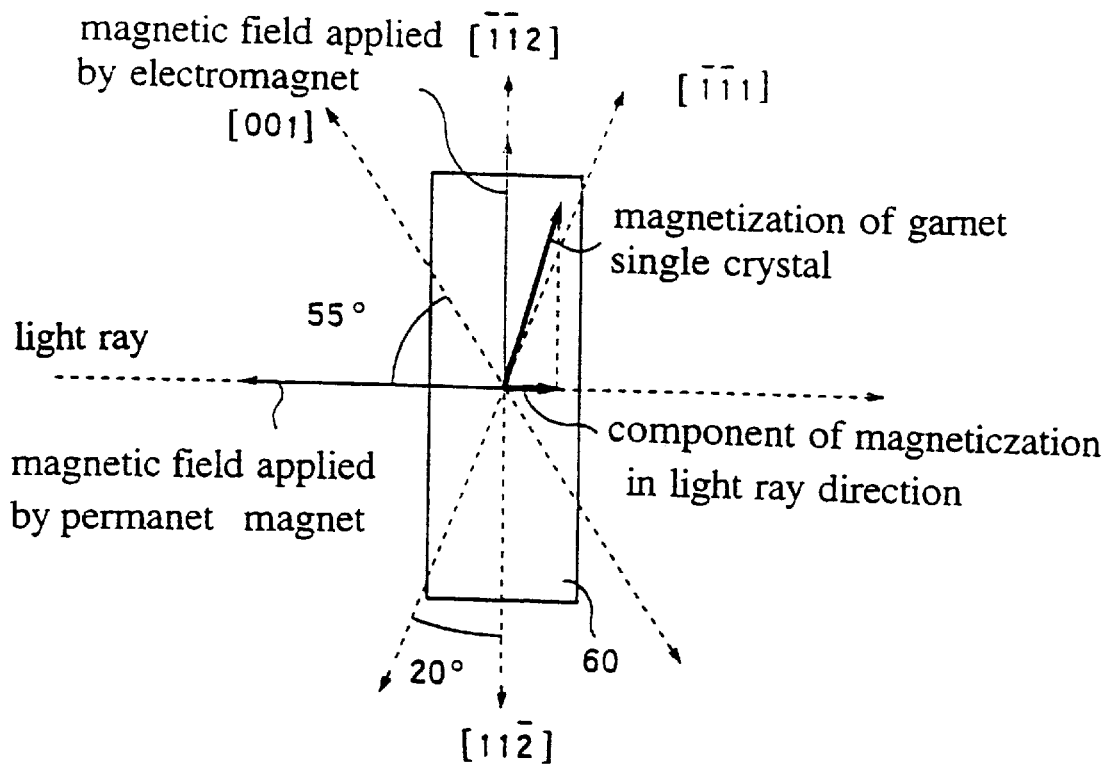
FIG. 11 is a sectional view showing a relationship between a magnetic field, a magnetization direction and a crystal orientation in the case where a magnetic field is applied along a route "a"

FIG. 7 is a graph showing the result obtained in the condition that the magnetic field is applied by the electromagnet in the direction along the ($\bar{1}12$) orientation. In other words, the vector path of a synthetic magnetic field of the magnetic fields applied by the electromagnet and permanent magnet becomes the path "a" shown in FIG. 6. In the path "a", the (001) plane is present near the center of the path, specifically, at a position 55° offset from the (111) plane. The cross-section of the path "a" is shown in FIG. 11. Referring to FIG. 11, the magnetization of a garnet single crystal 60 is easy to be directed to the (111) orientation and the ($\bar{1}\bar{1}1$) orientation as the easy axes, and is hard to be directed to the (001) orientation as the hard axis. The degree thereof becomes larger with decreasing temperature, and accordingly, as the temperature becomes lower, the magnetization more rapidly passes through the (001) orientation and comes closer to the ($\bar{1}\bar{1}1$) orientation, so that the spectrum of the Faraday rotation angle comes into that shown in FIG. 7. Referring again to FIG. 7, when the magnetic field applied by the electromagnet becomes larger, the plus sign of the Faraday rotation angle is changed into the minus sign at a measurement temperature of each of 10° C. and 25° C. This is because the component of the magnetization in the light ray direction is changed from reversely to forwardly with respect to the traveling direction of the light rays. In FIG. 7, the temperature dependencies on the Faraday rotation angle measured at three current values of 15 mA, 20 mA and 25 mA are largely different from each other. The temperature coefficient of the Faraday rotation angle is negative at the point of 15 mA; nearly zero at the point of 20 mA; and positive at the point of 25 mA.

Such a phenomenon will be described below. As described above, the temperature coefficient of the Faraday rotation angle is determined on the basis of the equation (4). As the temperature becomes higher, the Faraday effect becomes smaller and thereby the Faraday rotation angle becomes smaller. That is to say, the temperature coefficient of the Faraday rotation angle due to the temperature dependence on the Faraday effect, expressed by the first term on the right side of the equation (4), becomes negative. On the contrary, the temperature coefficient of the Faraday rotation angle due to the temperature dependence on the magnetocrystalline anisotropy, expressed by the second term on the right side of the equation (4), differs at each current point. This is because, as the current value differs, the vector direction of the synthetic magnetic field of the magnetic fields applied by the electromagnet and permanent magnet differs (that is, the direction of the magnetic field applied to the Faraday element varies). At the point of 15 mA, as the temperature becomes lower, the rotation angle α of magnetization becomes smaller because the magnetization of the crystal cannot approach the <001> orientation. In other words, at the point of 15 mA, the rotation angle α becomes larger as the temperature becomes higher, and therefore, the temperature coefficient expressed by the second term becomes negative. As a result, at the point of 15 mA, the temperature coefficients expressed by the first and second terms are both negative, so that the measured temperature coefficient $$\frac{d\theta_F}{dT}$$

of the Faraday rotation angle is also negative. At the point of 25 mA, the magnetization of the crystal cannot approach the <001> orientation as the temperature becomes lower; however, since the magnetization of the crystal has already passed through the <001> orientation, the rotation angle α of magnetization becomes larger. In other words, at the point of 25 mA, the rotation angle α becomes smaller as the temperature becomes higher. As a result, at the point of 25 mA, the temperature coefficient expressed by the second terms becomes positive and further the absolute value thereof is larger than that of the temperature coefficient expressed by the first term, so that the measured temperature coefficient $$\frac{d\theta_F}{dT}$$

of the Faraday rotation angle becomes positive. On the other hand, at the point of 20 mA, the temperature coefficient expressed by the second term is positive and further the absolute value thereof is nearly equal to that of the temperature coefficient expressed by the first term, so that both the temperature coefficients expressed by the first and second terms can be canceled each other into approximately zero.

FIG. 8 is a graph showing the result obtained in the condition that the magnetic field is applied to the Faraday element by the electromagnet in the direction along an orientation 24° offset from the ($\bar{1}12$) orientation to the ($\bar{1}01$) orientation. That is to say, the vector path of a synthetic magnetic field of the magnetic fields applied by the electromagnet and permanent magnet becomes the path "b" shown in FIG. 6. Any easy axis and hard axis are not present on the path "b" but the (001) orientation is present near the path "b". By the effect of the presence of the (001) orientation near the path "b", the first and second terms on the right side of the equation (4) are canceled each other, and consequently the Faraday rotation angles measured at 10° C., 25° C. and 65° C. are nearly equal to each other.

FIG. 9 is a graph showing the result obtained in the condition that the magnetic field is applied to the Faraday element by the electromagnet in the direction along the ($\bar{1}$01) orientation. That is to say, the vector path of a synthetic magnetic field of the magnetic fields applied by the electromagnet and permanent magnet becomes the path "c" shown in FIG. 6. The path "c" is most remote from the easy axes and hard axes, and further, the nearest easy axes or hard axes are symmetrically positioned with respect to the path "c". For example, the nearest easy axes ($\bar{1}$11) and ($\bar{1}$11) or the hard axes (001) and ($\bar{1}$00) are symmetrically positioned with respect to the path "c". As a result, the magnetization direction of the crystal is little affected by the magnetocrystalline anisotropy, and therefore, it follows a synthetic vector of vectors of the magnetic fields applied by the electromagnet and permanent magnet. The temperature coefficient of the Faraday rotation angle is little dependent on the second term but on the first term, and therefore, it becomes negative.

FIG. 10 is a graph showing the result obtained in the condition that the magnetic field by the electromagnet is applied to the Faraday element in the direction along the ($\bar{2}$11) orientation. That is to say, the vector path of a synthetic magnetic field of the magnetic fields applied by the electromagnet and permanent magnet becomes the path "d" shown in FIG. 6. In the path "d", the ($\bar{1}$11) plane is present at a position 70° offset from the center, that is, the (111) plane. The magnetization of the crystal is easy to be directed to the (111) orientation and the ($\bar{1}$11) orientation as the temperature becomes lower. When the magnetization of the crystal is directed to the ($\bar{1}$11) orientation, the Faraday rotation angle becomes 11° on the basis of the following calculation:

$$\theta_{Fmax} \times \cos 70 = ° \times \cos 70 = 11$$

where $\theta_{Fmax}$ is the maximum Faraday rotation angle when the magnetization is directed to the light ray direction.

In the spectrum of the Faraday rotation angle shown in FIG. 10, the Faraday rotation angle is larger than that in the spectrum shown in FIG. 9 on the higher current side. This is due to the fact that the magnetization of the crystal is directed to the vicinity of the ($\bar{1}$11) orientation.

In this way, by applying a magnetic field to the garnet single crystal in a specific direction thereof, the sign (plus or minus) of the second term can be reversed to that of the first term. This makes it possible to cancel the amounts of the changes in the Faraday rotation angle due to the first and second terms each other and hence to make smaller the temperature dependence on the Faraday rotation angle. The magnetic field may be applied in a single specific direction as shown in FIGS. 7 and 8. Alternatively, in consideration of the fact that the spectra of the Faraday rotation angles shown in FIGS. 7 to 10 are largely different from each other, a plurality of garnet single crystals may be used for the Faraday element, and the magnetic field may be applied to each crystal in an arbitrary direction in such a manner that the total temperature dependencies on the Faraday rotation angle are made smaller.

Based on the symmetry of the crystal, as shown in FIG. 6, the change in Faraday rotation angle due to the applied magnetic field by the electromagnet in the direction along the ($\bar{1}\bar{1}$2) that is, the path "a" is the same as that due to the applied magnetic field by the electromagnet in the direction along the orientation symmetrically equivalent to the ($\bar{1}\bar{1}$2) that is, the ($\bar{1}$21) orientation or the ($\bar{2}$11) orientation 120° offset from the ($\bar{1}\bar{1}$2) orientation. The same is true for each of the paths "b" to "d".

The present invention will be more fully described by example of the following embodiments:

First Embodiment

A measurement system as shown in FIG. 3 was manufactured. Using the measurement system, the temperature dependence on the Faraday rotation angle of a Faraday element was measured by a polarization modulation method, and then the temperature dependence on the amount of light attenuation was measured in a condition that the polarizer and the analyzer were fixed with an angle between polarization planes of light rays passing therethrough set at 135°. The magnetic field applied by a permanent magnet was set at 150 Oe, and the drive current of an electromagnet was fixed at 20 mA. The structure of the measurement system is basically the same as that of an optical isolator, and therefore, the amount of light attenuation is equivalent to the backward-loss.

A garnet single crystal used for the Faraday element was manufactured in the procedure shown in FIGS. 5A to 5D. A Bi substitution rare earth element-iron garnet single crystal (LPE film, composition: $Tb_{1.00}Y_{0.65}Bi_{1.35}Fe_{4.05}Ga_{0.95}O_{12}$, film thickness: 450 μm) was grown onto the (111) oriented substrate having a diameter of 3 inches and a thickness of 1170 μm using a flux of $PbO-B_2O_3-Bi_2O_3$ by the LPE method. In addition, the above substrate has a lattice constant of 12.496 Å and a composition of $(CaGd)_3(MgZrGa)_5O_{12}$. As shown in FIGS. 5A to 5D, the substrate is previously formed with two large and small flat planes. The large flat plane is the ($\bar{1}$10) plane, and the small flat plane is the (11$\bar{2}$) plane. The LPE film grown on the substrate thus obtained was then cut into a size of 7.6 mm×5.0 mm, being polished to remove the substrate therefrom, and the LPE film was annealed in atmospheric air at 1100° C. for 8 hr. The annealing is performed for reducing the uniaxial magnetocrystalline anisotropy constant due to growth induction. The LPE film was then polished again to be thus mirror-finished into a shape of 7.6 mm×5.0 mm×0.35 mm. Antireflection coatings were deposited on both the front and rear (111) planes of the LPE film. The LPE film was cut into a size of 1.0 mm×1.2 mm×0.35 mm. Finally, an intersection among the (111) plane, ($\bar{1}$10) plane and ($\bar{1}\bar{1}$2) plane was slightly cut off to form an orientation mark. A magnetic field required for realizing the magnetic saturation state of the garnet single crystal was measured by the VSM (Vibrating Sample Magnetometer). As a result, the required magnetic field was 120 Oe. On the basis of the measured result, a fixed magnetic field of 150 Oe was applied to the garnet single crystal by a permanent magnet, to thus realize the magnetic saturation state of the garnet single crystal. The Faraday rotation angle of the garnet single crystal was measured in a condition that light rays were made incident on the garnet single crystal in the direction perpendicular to the plane, on which the antireflection coating was deposited, that is, (111) plane of the garnet single crystal.

Figures 12A, 12B:
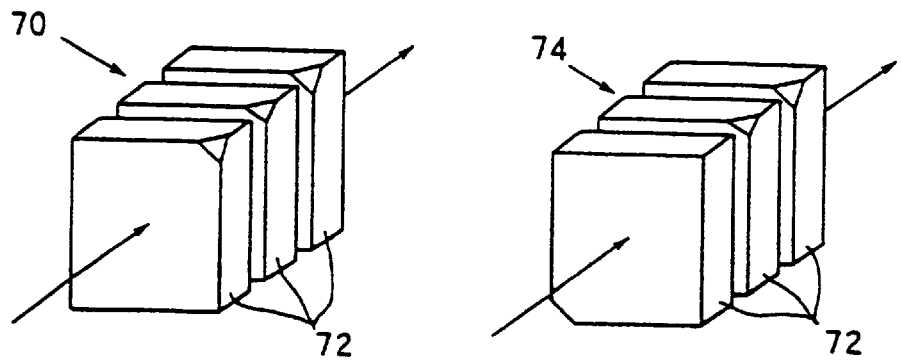
FIGS. 12A and 12B are illustrative diagrams showing an arrangement direction of magnetic garnet single crystals used for a Faraday element.

As shown in FIG. 12A, a Faraday element 70 was prepared by arranging three pieces of magnetic garnet single crystals 72 manufactured as described above with the orientations aligned with each other such that the ($\bar{1}\bar{1}$2) planes on the chamfered sides are arranged on the S-pole side of the electromagnet. That is to say, the magnetic field is applied in the ($\bar{1}\bar{1}$2) orientation by the electromagnet. This is equivalent to the case where the current of the electromagnet is set at 20 mA in the path "a" shown in FIG. 7. The garnet single crystal has a Faraday rotation angle of about 34° when the magnetization is directed to the direction parallel to light rays, and accordingly, the Faraday element has a Faraday rotation angle of 34°×3=102°. The reason why three pieces of the garnet single crystals are used in this embodiment is that since the thickness of the garnet single crystal cut from the grown crystal having a film thickness of 450 μm becomes thin, the Faraday rotation angle per one garnet single crystal becomes small. At the present day, it is difficult to grow a garnet single crystal up to a thickness more than 500 μm without occurrence of defects and cracks by the LPE method. However, if the crystal growth technique will advance to grow a garnet single crystal up to a thickness more than 500 μm without occurrence of defects and cracks, and hence to make large the Faraday rotation angle of one crystal by increasing the thickness of one garnet single crystal after being cut from the grown crystal, the number of the garnet single crystals used may be two pieces or one piece.

Figure 13:
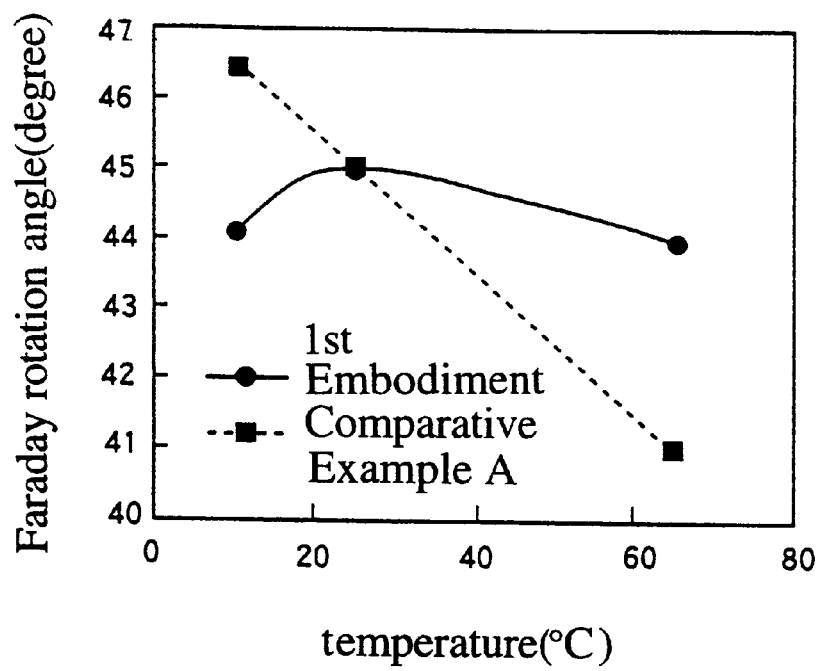
FIG. 13 is a graph showing a relationship between a temperature and a Faraday rotation angle for each of a first embodiment and a comparative example A.
Figure 14:
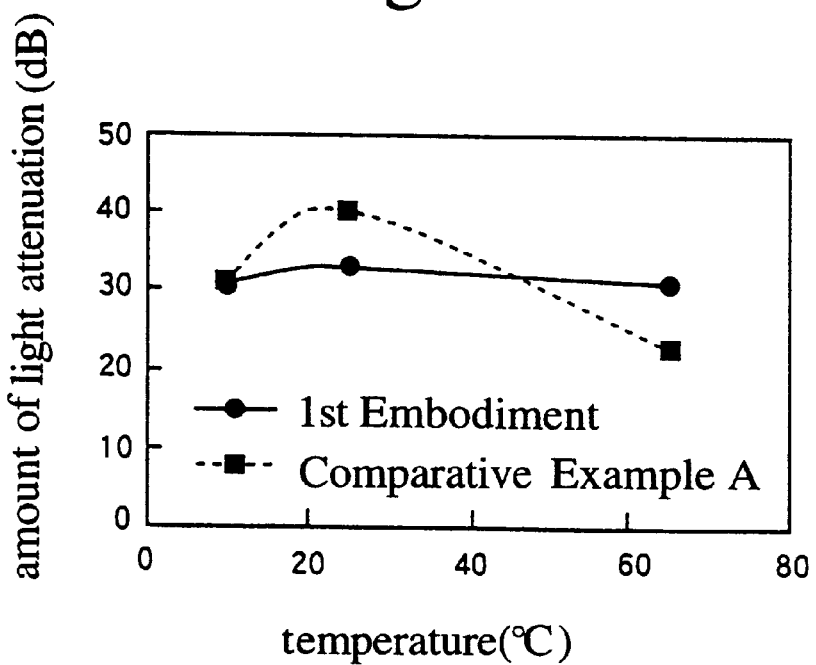
FIG. 14 is a graph showing a relationship between a temperature and an amount of light attenuation for each of the first embodiment and the comparative example A.

The garnet single crystal was applied with a magnetic field by an electromagnet in the direction perpendicular to a light ray direction, and was applied with a magnetic field by a permanent magnet in the direction parallel to the light ray direction. The result of measuring the Faraday rotation angle is shown in FIG. 13, and the result of measuring the amount of light attenuation is shown in FIG. 14. From the results shown in FIGS. 13 and 14, it is apparent that both the Faraday rotation angle and the amount of light attenuation in the first embodiment have small temperature dependence, and therefore, the Faraday rotator is advantageous when used for an optical isolator. In the case of actually manufacturing the optical isolator, the magnetization of the magnetic garnet single crystals may be tiled with respect to the optical axis using the permanent magnet and electromagnet as in this embodiment; the magnetization of the magnetic garnet single crystals may be tiled with respect to the optical axis by arranging a pair of permanent magnets obliquely with respect to the optical axis; or the magnetization of the magnetic garnet single crystals may be tilted with respect to the optical axis by arranging one cylindrical permanent magnet obliquely with respect to the optical axis and placing the magnetic garnet single crystals in the permanent magnet with the deposited plane, that is, (111) plane of each of the single crystals directed perpendicularly to the optical axis. In each case, the same effect can be obtained, that is, the temperature dependence on the Faraday rotation angle can be made smaller.

A comparative example A shown in FIGS. 13 and 14 was manufactured in the following procedure, and then measured. A Faraday element was prepared by using two pieces of magnetic garnet single crystals, each having a thickness of 0.233 mm, which were manufactured in the same manner as that in the first embodiment. The Faraday element has a Faraday rotation angle of about 45° when the magnetization direction was rendered parallel to a light rays direction. The Faraday rotation angle and the amount of light attenuation were measured in a condition that the electromagnet was removed from the measurement system shown in FIG. 3 and only a magnetic field was applied to the crystal by the permanent magnet. Each of the two magnetic garnet single crystals was arranged such that light rays were made incident on the crystal in the direction perpendicular to a plane on which an antirefraction coating was deposited, that is, (111) plane of the garnet single crystal. The magnetization of each magnetic garnet single crystal was saturated by the permanent magnet, and was directed to the direction parallel to the optical axis. First, the temperature dependence on the Faraday rotation angle was measured by the polarization modulation method, and then the temperature dependence on the amount of light attenuation was measured in a condition that the polarizer and analyzer were fixed with an angle between the polarization planes of light rays passing therethrough set at 135°. The structure of the measurement system is basically the same as that of the prior art optical isolator, and therefore, the amount of light attenuation is equivalent to the backward loss.

Second Embodiment

A garnet single crystal having a size of 1.0 mm×1.2 mm×0.33 mm was manufactured in the same procedure as that in the first embodiment. The garnet single crystal has a Faraday rotation angle of about 32° when the magnetization is directed to the direction parallel to a light ray direction. Using the measurement shown in FIG. 3, the temperature dependence on the Faraday rotation angle was measured by the polarization modulation method, and then the temperature dependence on the amount of light attenuation was measured in a condition that the polarizer and the analyzer were arranged with an angle between the polarization planes of light rays passing therethrough set at 105°. The magnetic field of a permanent magnet was set at 150 Oe, and the drive current of an electromagnet was variable in a range of 0 to 80 mA. The structure of the measurement system is basically the same as that of an optical attenuator. As shown in FIG. 12B, a Faraday element 74 was prepared by arranging three pieces of magnetic garnet single crystals 72 manufactured as described above with the orientations changed such that the ($\overline{1}12$) plane, on the chamfered side, of the front garnet single crystal was located on the S-pole side of the electromagnet and the ($\overline{1}12$) planes, on the chamfered side, of the rear two garnet single crystals were located on the N-pole side of the electromagnet. The garnet single crystal was applied with a magnetic field by the electromagnet in the direction perpendicular to the light ray direction and was applied with a magnetic field by the permanent magnet in the direction parallel to the light rays direction. This means that each of the rear two garnet single crystals is applied with the magnetic field in the direction along a line, in a stereographic projection chart, which connects the center expressing the (111) plane to a position expressing the (11$\overline{2}$) plane on the outermost peripheral circle, and the front magnetooptical crystal is applied with the magnetic field in the direction along a line, in the stereographic projection chart, which connects the center expressing the (111) plane to a position expressing the ($\overline{1}12$) plane on the outermost peripheral circle.

Figure 15:
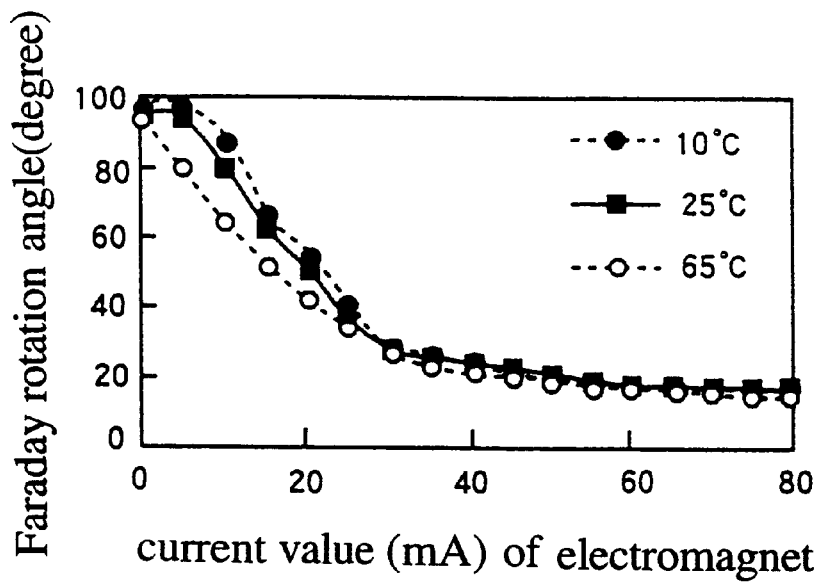
FIG. 15 is a graph showing a relationship between a current value of an electromagnet and a Faraday rotation angle in a second embodiment.
Figure 16:
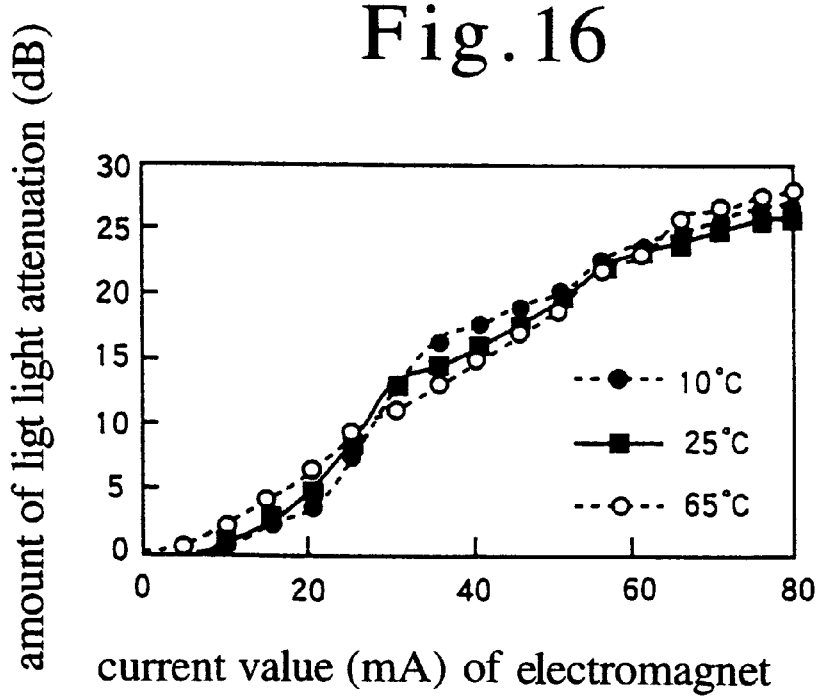
FIG. 16 is a graph showing a relationship between a current value of an electromagnet and an amount of light attenuation in the second embodiment.

The result of measuring the Faraday rotation angle is shown in FIG. 15 and the result of measuring the amount of light attenuation is shown in FIG. 16. From the result shown in FIG. 15, it is apparent that the temperature dependence on the Faraday rotation angle is small when a large current is applied to the electromagnet. From the result shown in FIG. 16, it is apparent that the temperature dependence on the amount of light attenuation is small. As a result, the above configuration in this embodiment is effective for a magnetooptic type variable optical attenuator.

Third Embodiment

A garnet single crystal having a size of 1.0 mm×1.2 mm×0.33 mm was manufactured in the same procedure as that in the first embodiment. The garnet single crystal has a Faraday rotation angle of about 32° when the magnetization is directed to the direction parallel to a light ray direction. Using the measurement system shown in FIG. 3, the temperature dependence on the Faraday rotation angle was measured by the polarization modulation method, and then the temperature dependence on the amount of light attenuation was measured in a condition that the polarizer and the analyzer were arranged with an angle between the polarization planes of light rays passing therethrough set at 105°. The magnetic field of a permanent magnet was set at 150 Oe, and the drive current of an electromagnet was variable in a range of 0 to 80 mA. The structure of the measurement system is basically the same as that of an optical attenuator. As shown in FIG. 12A, a Faraday element 70 was prepared by arranging three pieces of magnetic garnet single crystals 72 manufactured as described above with the orientations aligned with each other, and was applied with a magnetic field by the electromagnet in the direction along an orientation 24° offset from the ($\bar{1}12$) orientation to the ($\bar{1}01$) orientation. The garnet single crystal was applied by the electromagnet in the direction perpendicular to the light ray direction, and was applied with a magnetic field by the permanent magnet in the direction parallel to the light ray direction. This means that the magnetooptic crystal is applied with the magnetic field in the direction along a line, in a stereographic projection chart, which connects the center expressing the (111) plane to a position, on the outermost peripheral circle, 24° offset from the ($\bar{1}12$) orientation to the ($\bar{1}01$) orientation.

Figure 17:
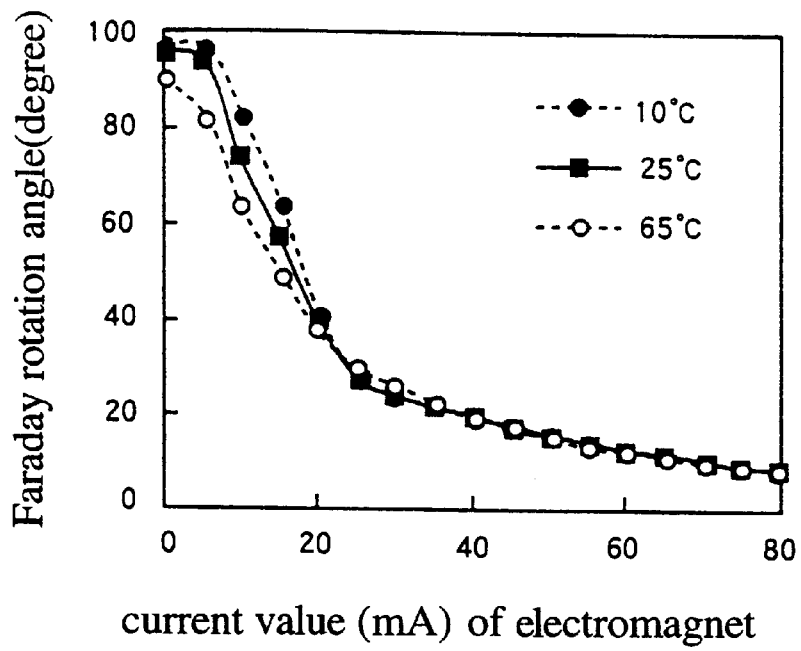
FIG. 17 is a graph showing a relationship between a current value of an electromagnet and a Faraday rotation angle in a third embodiment.
Figure 18:
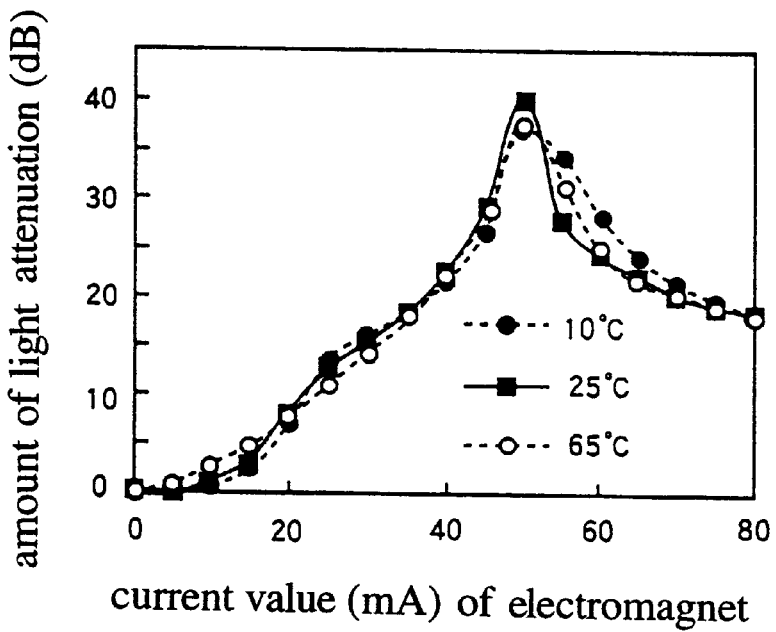
FIG. 18 is a graph showing a relationship between a current value of an electromagnet and an amount of light attenuation in the third embodiment.

The result of measuring the Faraday rotation angle is shown in FIG. 17 and the result of measuring the amount of light attenuation is shown in FIG. 18. From the result shown in FIG. 17, it is apparent that the temperature dependence on the Faraday rotation angle is small. From the result shown in FIG. 18, it is apparent that the temperature dependence on the amount of light attenuation is small. As a result, the above configuration in this embodiment is effective for a magnetooptic type variable optical attenuator.

REFERENCE EXAMPLE 1

A garnet single crystal having a size of 1.0 mm×1.2 mm×0.33 mm was manufactured in the same procedure as that in the first embodiment. The garnet single crystal has a Faraday rotation angle of about 32° when the magnetization is directed to the direction parallel to a light ray direction. Using the measurement system shown in FIG. 3, the temperature dependence on the Faraday rotation angle was measured by the polarization modulation method, and then the temperature dependence on the amount of light attenuation was measured in a condition that the polarizer and the analyzer were arranged with an angle between the polarization planes of light rays passing therethrough set at 105°. The magnetic field applied by a permanent magnet was set at 150 Oe, and the drive current of an electromagnet was variable in a range of 0 to 80 mA. The structure of the measurement system is basically the same as that of an optical attenuator. As shown in FIG. 12A, a Faraday element was prepared by arranging three pieces of single crystals manufactured as described above with the orientations thereof aligned with each other such that the ($\bar{1}10$) planes thereof were located on the S-pole side of the electromagnet. That is to say, the magnetic field is applied by the electromagnet in the direction along the ($\bar{1}10$) orientation. The garnet single crystal was applied with the magnetic field by the electromagnet in the direction perpendicular to the light ray direction, and was applied with the magnetic field by the permanent magnet in the direction parallel to the light ray direction.

Figure 19:
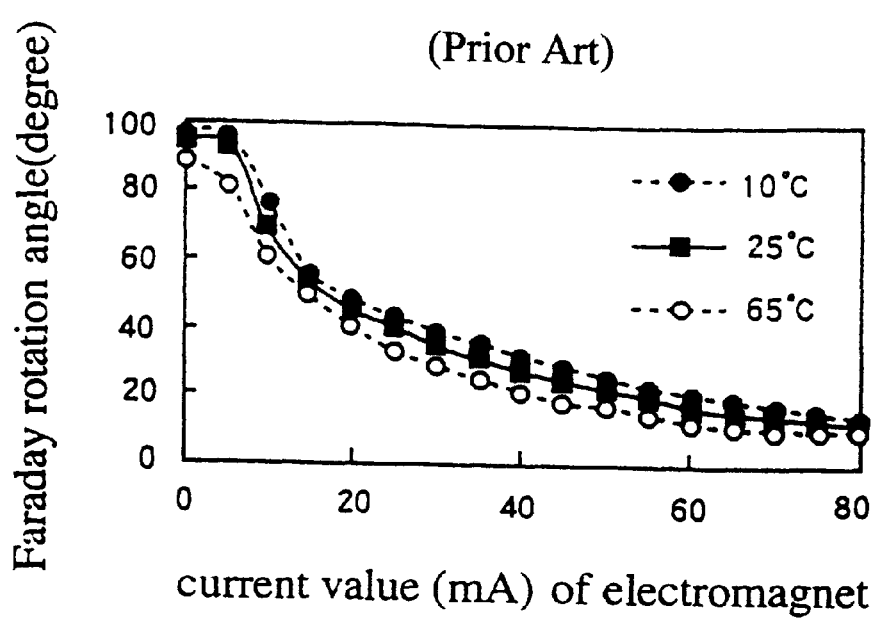
FIG. 19 is a graph showing a relationship between a current value of an electromagnet and a Faraday rotation angle in a reference example 1.
Figure 20:
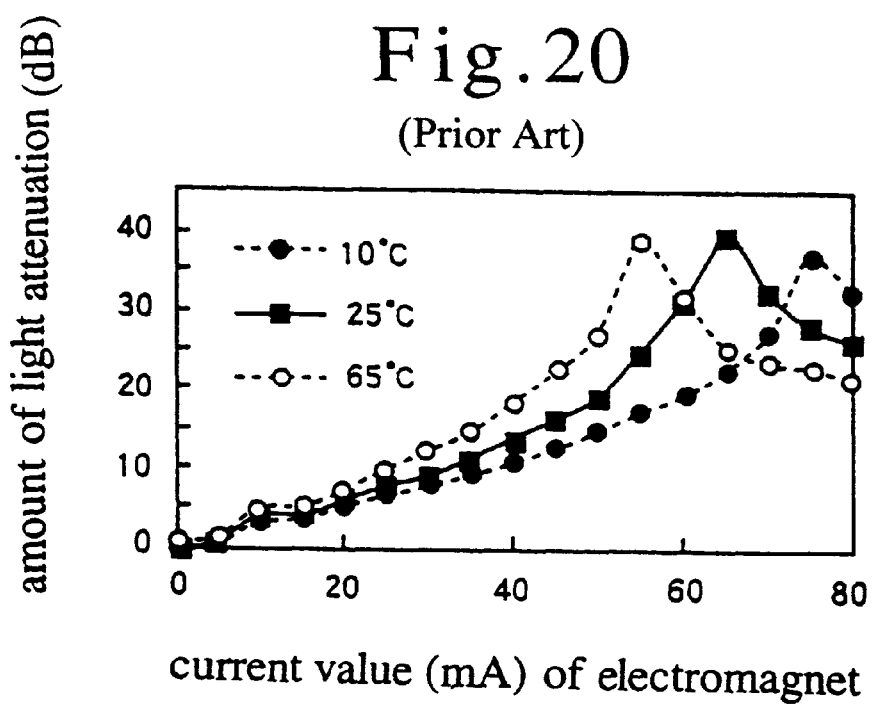
FIG. 20 is a graph showing a relationship between a current value of an electromagnet and an amount of light attenuation in the reference example 1.
Figure 21A:
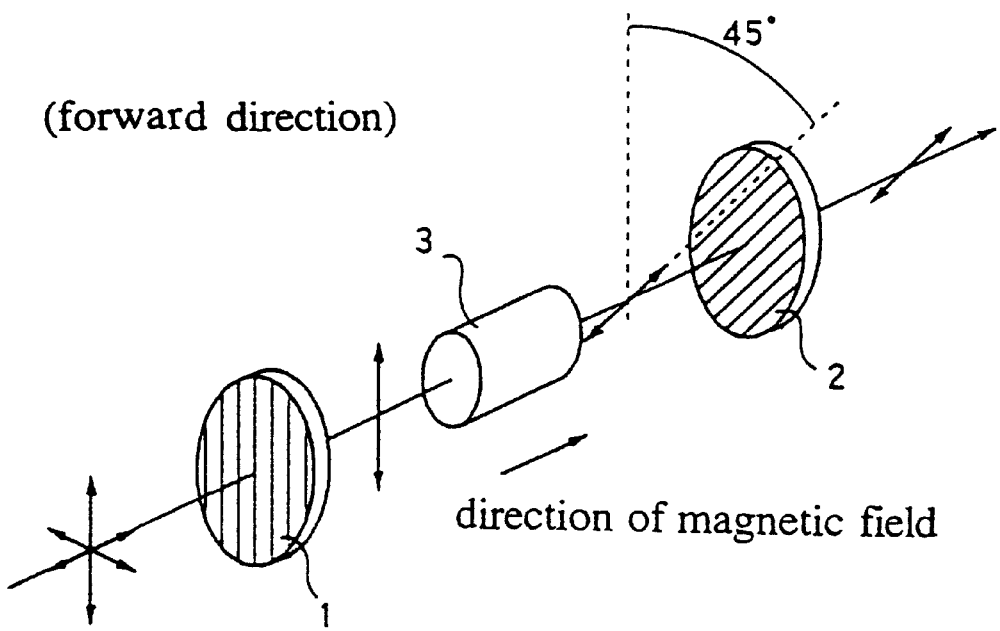
FIGS. 21A and 21B are illustrative views showing the configuration of one example of an optical isolator.
Figure 21B:
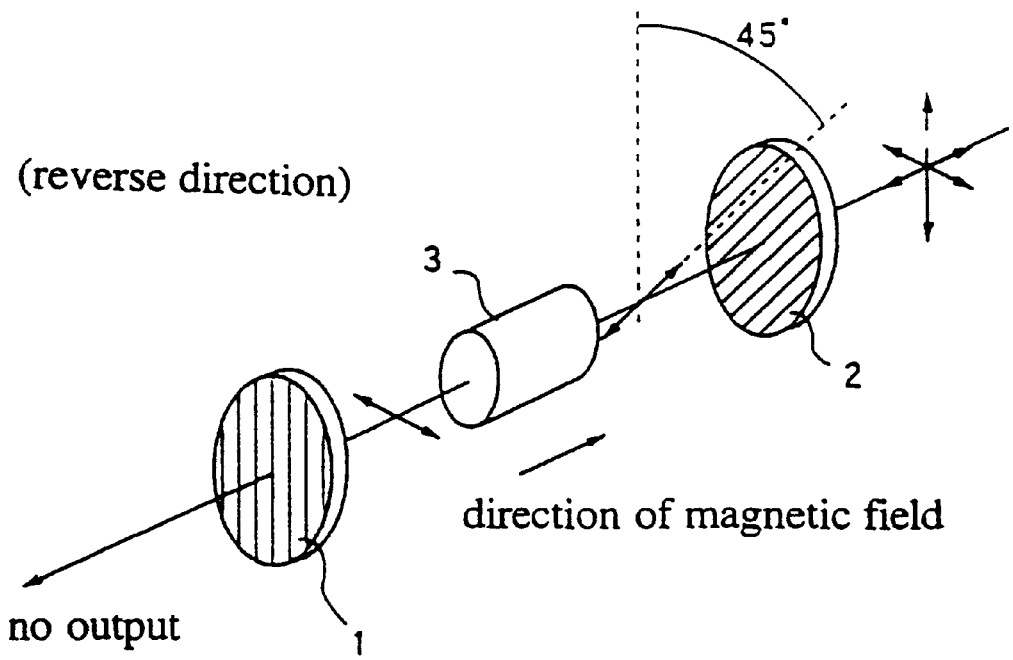

The result of measuring the Faraday rotation angle is shown in FIG. 19 and the result of measuring the amount of light attenuation is shown in FIG. 20. From the results shown in FIGS. 19 and 20, it is apparent that the temperature dependence on each of the Faraday rotation angle and the amount of light attenuation is large. As seen from this result, the above configuration in this reference example 1 is unsuitable for a magnetooptic type variable optical attenuator.

While the preferred embodiments of the present invention have been described using the specific terms, such description is for illustrative purposes only, and it is to be understood that changes and variations may be made without departing from the spirit or scope of the following claims.

What is claimed is:

1. A Faraday rotator comprising:
   a Faraday element which rotates the polarization plane of polarized light rays passing through said Faraday element when an external magnetic field is applied to said Faraday element,
   characterized in that the direction of said external magnetic field has been adjusted to satisfy the following conditions "A" and "B" regarding $$\frac{d\theta_F}{dT} = \left[\theta_{Fmax} \times (-\sin\alpha)\frac{d\alpha}{dT}\right] + \left[\cos\alpha \times \frac{d\theta_{Fmax}}{dT}\right]$$

that is the change of Faraday rotation angle per change of temperature, when the angle between the resultant magnetization direction of said Faraday element and the direction of the polarized light rays is represented by α, the resultant Faraday rotation angle is expressed as $\theta_F = \theta_{Fmax} \times \cos\alpha$, wherein $\theta_{Fmax}$ is the maximum value of the Faraday rotation angle, which value is obtained when the magnetization direction is equal to the light ray direction, and wherein said resultant magnetization is due to said external magnetic field and said Faraday element wherein, condition A is:

$$\left[\theta_{Fmax} \times (-\sin\alpha)\frac{d\alpha}{dT}\right] + \left[\cos\alpha \times \frac{d\theta_{Fmax}}{dT}\right] < 0,$$

where "T" represents the temperature; and, condition B is: the absolute value of one of the first amount $$\left[\theta_{Fmax} \times (-\sin\alpha) \times \frac{d\alpha}{dt}\right]$$

and second amount $$\left[\cos\alpha \times \frac{d\theta_{Fmax}}{dT}\right]$$

is less than twice the absolute value of the other amount.

2. A Faraday rotator comprising:
   a Faraday element composed of a single or a plurality of magnetooptic crystals, which rotates the polarization plane of polarized light rays passing through said Faraday element when an eternal magnetic field is applied to said Faraday element,
   characterized in that the direction of said external magnetic field has been adjusted so as to satisfy the following conditions "C" and "D" regarding $$\frac{d\theta_F}{dT} = \left[\theta_{Fmax} \times (-\sin\alpha) \times \frac{d\alpha}{dT}\right] + \left[\cos\alpha \times \frac{d\theta_{Fmax}}{dT}\right],$$

that is the change of Faraday rotation angle per change of temperature, when the angle between the resultant magnetization direction of said single or plurality of magnetooptic crystals and the direction of the polarized light rays is represented by α, the resultant Faraday rotation angle is expressed as $\theta_F = \theta_{Fmax} \times \cos\alpha$, wherein $\theta_{Fmax}$ is the mazimum value of the Faraday rotation angle, which value is obtained when the magnetization direction is equal to the light ray direction, and wherein said external magnetic field is applied in a single direction, wherein condition is:

$$\left[ \theta_{Fmax} \times (-\sin\alpha) \times \frac{d\alpha}{dT} \right] \times \left[ \cos\alpha \times \frac{d\theta_{Fmax}}{dT} \right] < 0,$$

wherein "T" represents the temperature; and, condition D is the absolute value of one of the first amount $$\left[ \theta_{Fmax} \times (-\sin\alpha) \times \frac{d\alpha}{dT} \right]$$

and second amount $$\left[ \cos\alpha \times \frac{d\theta_{Fmax}}{dT} \right]$$

is less than twice the absolute value of the other amount.

3. A Faraday rotator according to claim 1 or 2, characterized in that the direction of said external magnetic field is such that said first amount $$\left[ \theta_{Fmax} \times (-\sin\alpha) \times \frac{d\alpha}{dT} \right]$$

and said second amount $$\left[ \cos\alpha \times \frac{d\theta_{Fmax}}{dT} \right]$$

have substantially equal absolute values.

4. A Faraday rotator comprising:
a Faraday element which rotates the polarization plane of polarized light rays passing through said Faraday element when an external magnetic field is applied to said Faraday element,
wherein a magnetooptic crystal constituting said Faraday element has a composition of

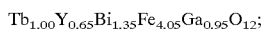
$Tb_{1.00}Y_{0.65}Bi_{1.35}Fe_{4.05}Ga_{0.95}O_{12}$;

and
the amount of the temperature-dependent change in Faraday rotation angle is reduced by applying magnetic field to said magnetooptic crystal in a direction along a line, in a stereographic projection chart of said magnetooptic crystal, which connects the center expressing the (111) plane to a position 24° offset from the ($\overline{112}$) plane to the ($\overline{101}$) plane on the outermost peripheral circle of the stereographic projection chart.

5. A Faraday rotator comprising:
a Faraday element which rotates the polarization plane of polarized light rays passing through said Faraday element when an external magnetic field is applied to said Faraday element,
wherein said Faraday element is composed of three pieces of magnetooptic crystals each of which has a composition of $Tb_{1.00}Y_{0.65}Bi_{1.35}Fe_{4.05}Ga_{0.95}O_{12}$ and has a substantially equal thickness; and the amount of the temperature-dependent change in Faraday rotation angle is reduced by applying magnetic field to to pieces of said magnetooptic crystals in a direction along a line, in a stereographic projection chart of said magnetooptic crystal, which connects the center expressing the (111) plane to the ($11\overline{2}$) plane on the outermost peripheral circle, and applying magnetic field to the remaining magnetooptic crystal in a direction along a line, in stereographic projection chart, which connects the center expressing the (111) plane to the ($11\overline{2}$) plane on the outermost peripheral circle.

6. A Faraday rotator comprising:
a Faraday element composed of a plurality of magnetooptic crystals arranged with their crystal orientations made different from each other, which rotates the polarization plane of polarized light rays passing through said Faraday element when an external magnetic field is applied to said Faraday element, wherein the total number of said plurality of magnetooptic crystals are represented by "k",
characterized in that the direction of said external magnetic field has been adjusted so as to satisfy the following condition "E" regarding $$\frac{d\theta_F}{dT} = \sum_{i=1}^{k} \left[ \theta_{fimax} \times (-\sin\alpha_i) \times \frac{d\alpha_i}{dT} \right] + \sum_{i=1}^{k} \left[ \cos\alpha_i \times \frac{d\theta_{Fimax}}{dT} \right],$$

that is the change of Faraday rotation angle per change of temperature, when the angles between magnetization directions $M_i$ of said magnetooptical crystals $C_i$ and a light ray transmission direction are represented by $\alpha_i$, wherein "i" represents all of the natural numbers from 1 through k, the resultant Faraday rotation angle is expressed as $$\theta_F = \sum_{i=1}^{k} \theta_{Fi} = \sum_{i=1}^{k} (\theta_{Fimax} \times \cos\alpha_i),$$

wherein $\theta_{Fimax}$ is the maximum value of the Faraday rotation angle of said crystal $C_i$, which value is obtained when the magnetization direction $M_i$ of said crystal $C_i$ is equal to the light ray direction, wherein condition E is:

$$\left| \sum_{i=1}^{k} \left[ \theta_{Fimax} \times (-\sin\alpha_i) \frac{d\alpha_i}{dT} + \cos\alpha_i \times \frac{d\theta_{Fimax}}{dT} \right] \right| \leq \left| \sum_{i=1}^{k} \left[ \cos\alpha_i \times \frac{d\theta_{Fimax}}{dT} \right] \right|.$$

7. A Faraday rotator according to any one of claims 1 or 2, and 6, wherein said magnetooptic crystal is grown by liquid phase epitaxial method and has a composition of

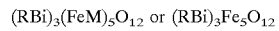
$(RBi)_3(FeM)_5O_{12}$ or $(RBi)_3Fe_5O_{12}$ where R is one or more kinds of elements selected from the group consisting of rare earth elements and M is one or more kinds of elements substitutable with iron.

8. A Faraday rotator according to any one of claims 1, 2, and 6, wherein said magnetooptic crystal has a composition of $Y_3Fe_5O_{12}$.

9. An optical isolator comprising:
a Faraday rotator which is the same as said Faraday rotator described in any one of claims 1, 2, 6, 4, and 5.

10. An optical attenuator comprising:
a Faraday rotator which is the same as said Faraday rotator described in any one of claims 1, 2, 6, 4, and 5.

11. A Faraday rotator according to any one of claims 1, 2, 6, 4, and 5, wherein external magnetic fields are applied in directions parallel to and perpendicular to a light ray direction by a permanent magnet and an electromagnet, and a magnetization direction of said Faraday element is tilted with respect to the light ray direction by a synthetic magnetic field of said two external magnetic fuels.

12. A method of controlling the temperature dependence on a Faraday rotator which is the same as said Faraday rotator described in claim 11, comprising the step of:

controlling the temperature dependence on the Faraday rotation angle by changing a magnetic field applied by said electromagnet.

13. An optical isolator comprising:

a Faraday rotator which is the same as said Faraday rotator described in claim 11, and a polarizer and an analyzer arranged on the front and rear sides of said Faraday rotator in the light ray direction;

wherein a magnetic field applied by said electromagnet is set such that the temperature dependence on the Faraday rotation angle is minimized.

14. An optical attenuator comprising:

a Faraday rotator which is the same as said Faraday rotator described in claim 11, and a polarizer and an analyzer arranged on the front and rear sides of said Faraday rotator in the light ray direction;

wherein an external magnetic field applied by said electromagnet is variable, and the quantity of light rays passing therethrough is controlled by varying said external magnetic field.

* * * * *